United States Patent
Shen et al.

(10) Patent No.: US 11,679,774 B1
(45) Date of Patent: Jun. 20, 2023

(54) SYSTEM AND METHOD TO REDUCE VERTICAL REFERENCE UNIT UNREFERENCED HEADING DRIFT ERROR

(71) Applicant: Honeywell International Inc., Charlotte, NC (US)

(72) Inventors: Zhizhen Shen, Shanghai (CN); Siqin Yu, Shanghai (CN)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 17/668,277

(22) Filed: Feb. 9, 2022

(51) Int. Cl.
*B60W 40/114* (2012.01)
*G06F 18/25* (2023.01)

(52) U.S. Cl.
CPC .......... *B60W 40/114* (2013.01); *G06F 18/25* (2023.01); *B60W 2420/905* (2013.01); *B60W 2520/16* (2013.01); *B60W 2520/18* (2013.01)

(58) Field of Classification Search
CPC ......... B60W 40/114; B60W 2420/905; B60W 2520/16; B60W 2520/18; G06F 18/25
See application file for complete search history.

(56) References Cited

U.S. PATENT DOCUMENTS

| | | | |
|---|---|---|---|
| 5,654,906 A * | 8/1997 | Youngquist | G05D 1/0808 701/14 |
| 6,681,159 B2 | 1/2004 | Li et al. | |
| 6,961,643 B1 | 11/2005 | Younkin et al. | |
| 9,250,716 B2 | 2/2016 | Sheng et al. | |
| 9,599,474 B2 | 3/2017 | Bye | |
| 2006/0217852 A1 | 9/2006 | Price | |
| 2007/0282529 A1* | 12/2007 | Thompson | G01C 21/188 701/3 |
| 2011/0172854 A1 | 7/2011 | Barker | |
| 2011/0190964 A1 | 8/2011 | Petillon | |

FOREIGN PATENT DOCUMENTS

CN 109520497 A 3/2019

* cited by examiner

*Primary Examiner* — Tyler J Lee
*Assistant Examiner* — Yufeng Zhang
(74) *Attorney, Agent, or Firm* — Fogg & Powers LLC

(57) ABSTRACT

A system to reduce VRU unreferenced heading drift error is disclosed. The VRU comprises an IMU and a processor, which hosts first and second modules for bias cancelation. The first module reads inertial data from the IMU when the VRU is powered on; determines whether the VRU is static for a time period; if the VRU is static, corrects gyroscope bias by subtracting an initial bias value from a previous bias value; sets a predefined initial yaw value. The second module reads inertial data from the IMU during in-run operation of the VRU; updates roll, pitch and yaw data, based on input data from a sensor fusion algorithm; outputs updated roll, pitch and yaw data; determines whether the VRU is static for a time period; and if the VRU is static, corrects the bias by subtracting a current bias value, multiplied by a predefined parameter, from a previous bias value.

19 Claims, 4 Drawing Sheets

SYSTEM AND METHOD TO REDUCE VERTICAL REFERENCE UNIT UNREFERENCED HEADING DRIFT ERROR

BACKGROUND

An inertial measurement unit (IMU) is used for motion sensing in various vehicles. A micro-electro-mechanical systems (MEMS) IMU is a common solution among low-cost and space-limited applications. A typical six-axis IMU contains a tri-axis gyroscope and a tri-axis accelerometer. This IMU can provide real-time angular rate output and linear acceleration output at high frequency, normally faster than 100 Hz. During operation, a user will typically receive data from the IMU together with other sensors, such as a GNSS receiver, a magnetometer, an odometer, or the like, which are located on a vehicle. A sensor fusion algorithm processes the combined data to determine position, attitude, and heading information for the vehicle.

A vertical reference unit (VRU) is based on an IMU hardware and includes an onboard algorithm that computes a three-dimensional (3D) orientation for a vehicle. The VRU provides drift-free roll data, pitch data, and drifting unreferenced yaw data. All these data are with respect to a gravity referenced frame. The pitch and roll output of the VRU can be used as an inclinometer. The unreferenced yaw data can be used as a horizontal turn angle sensor.

VRU onboard algorithms use IMU data to compute the orientation and unreferenced heading. Errors from the IMU data may greatly affect the accuracy of the VRU. The primary error source that contributes to VRU unreferenced heading drift is the gyroscope bias. The gyroscope bias is an unstable variable that changes each time when the gyroscope is powered on and in operation. The gyroscope bias is also affected by environment temperature, operation time, and other miscellaneous influences. While factory calibration may reduce the bias at a certain IMU grade, the calibration never eliminates the bias entirely.

SUMMARY

A system comprises a vertical reference unit (VRU) operative to output roll data, pitch data, and unreferenced yaw data for a vehicle. The VRU comprises an inertial measurement unit (IMU) including at least one gyroscope and at least one accelerometer, the IMU operative to generate inertial data. At least one processor is operatively coupled to the IMU, wherein the at least one processor hosts a plurality of processing modules operative to reduce unreferenced heading drift error produced by the VRU. The processing modules comprise first and second bias cancelation modules The first bias cancelation module includes instructions to cause the at least one processor to read the inertial data from the IMU when the VRU is powered on during start-up; determine whether the VRU is static for a preselected time period by using a first static detector; if the VRU is static for the preselected time period, correct gyroscope bias by subtracting an initial gyroscope bias value from a previous gyroscope bias value; and set a predefined initial yaw value. The second bias cancelation module includes instructions to cause the at least one processor to read the inertial data from the IMU during in-run operation of the VRU; update the roll data, pitch data, and yaw data, based on input data from a sensor fusion algorithm; output the updated roll data, pitch data, and yaw data; determine whether the VRU is static for a preselected time period by using a second static detector; and if the VRU is static for the preselected time period, correct the gyroscope bias by subtracting a current gyroscope bias value, multiplied by a predefined parameter, from a previous gyroscope bias value.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method to reduce vertical reference unit (VRU) unreferenced heading drift error is described herein.

The present method is implemented with a circulation bias cancelation (CBC) algorithm to reduce the yaw drift due to gyroscope bias change in the VRU. This algorithm is implemented to run in real-time to correct the gyroscope bias whenever the VRU is detected as static for a defined period of time. When the CBC algorithm is engaged it will significantly reduce heading drift and improve unreferenced yaw performance of the VRU in various applications. By applying the CBC algorithm, the VRU will have a better performance with respect to static yaw drift and dynamic yaw drift, as well as improved dynamic pitch/roll performance.

Further details related to the present system and method are described as follows and with reference to the drawings.

Figure 1A:
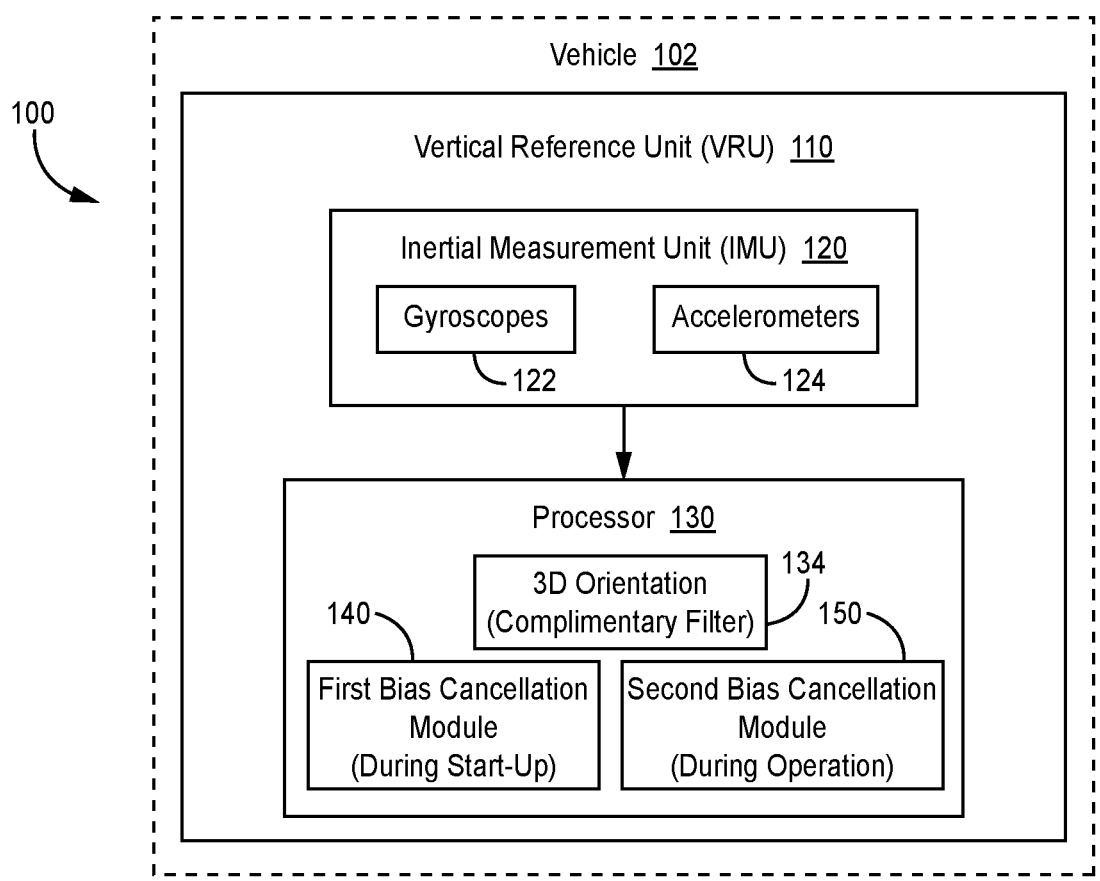
FIG. 1A is a block diagram of a system to reduce unreferenced heading drift error in a vertical reference unit (VRU), according to an exemplary embodiment.

FIG. 1A illustrates a system 100 to reduce VRU unreferenced heading drift error, according to an exemplary embodiment. The system 100 includes a VRU 110 operative to output roll data, pitch data, and unreferenced yaw data for a vehicle 102. For example, VRU 110 can be coupled to various vehicles such as land vehicles, water vehicles, or air vehicles.

The VRU 110 comprises an inertial measurement unit (IMU) 120, which includes one or more gyroscopes 122 and accelerometers 124. For example, IMU 120 can be a six degree of freedom (DOF) IMU (six-axis), such as a micro-electro-mechanical systems (MEMS) IMU having a tri-axis gyroscope and a tri-axis accelerometer. The IMU 120 is operative to measure and output inertial data, such as angular rate from gyroscopes 122 and specific force/acceleration from accelerometers 124.

The VRU 110 also includes at least one processor 130, such as a microprocessor with associated memory, which is operatively coupled to IMU 120. The processor 130 hosts a plurality of processing modules, including an orientation processing module 134 for computing a three-dimensional (3D) orientation of the vehicle, based on the inertial data from IMU 120. The orientation processing module 134 can be implemented using various methods such as a complimentary filter or Kalman filter.

The processor 130 also hosts a first bias cancelation module 140, which is used during start-up of VRU 110, and a second bias cancelation module 150, which is used during in-run operation of VRU 110. The operational steps of bias cancelation modules 140 and 150 implement the CBC algorithm, which is described in further detail hereafter. The bias cancelation modules 140 and 150 are operative to reduce unreferenced heading drift error produced by VRU 110 during start-up and subsequent in-run operation.

Figure 1B:
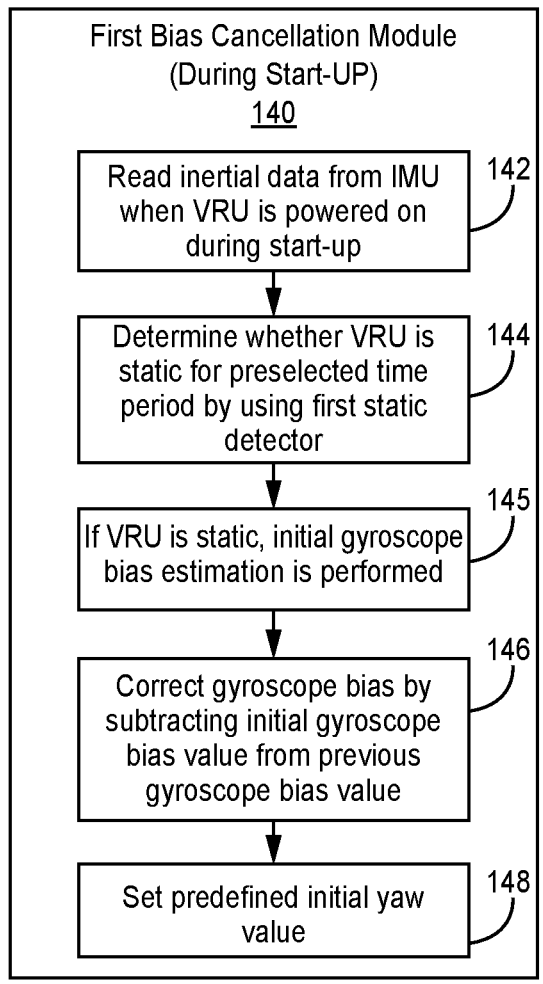
FIG. 1B is a flow diagram for a first bias cancelation module implemented by the system of FIG. 1A during start-up of the VRU.

As shown in FIG. 1B, first bias cancelation module 140 includes processor readable instructions to perform a method that reads the inertial data from the IMU when the VRU is powered on during start-up (block 142), and to determine whether the VRU 110 is static for a preselected time period, by using a first static detector (block 144). If the VRU is static for the preselected time period, an initial gyroscope bias estimation is performed (block 145). The gyroscope bias is corrected by a process comprising subtracting an initial gyroscope bias value from a previous (factory-defined) gyroscope bias value (block 146). A predefined initial yaw value is then set (block 148).

In bias cancelation module 140, the first static detector (block 144) comprises an average boundary parameter having a first threshold value, based on a predetermined static gyroscope data average during start-up of the VRU; and a variance boundary parameter having a second threshold value, based on a predetermined standard deviation of static gyroscope data. If the current gyroscope data, during start-up of the VRU, have a mean and standard deviation that are less than the first and second thresholds for the preselected time period, then the VRU is determined to be static.

Figure 1C:
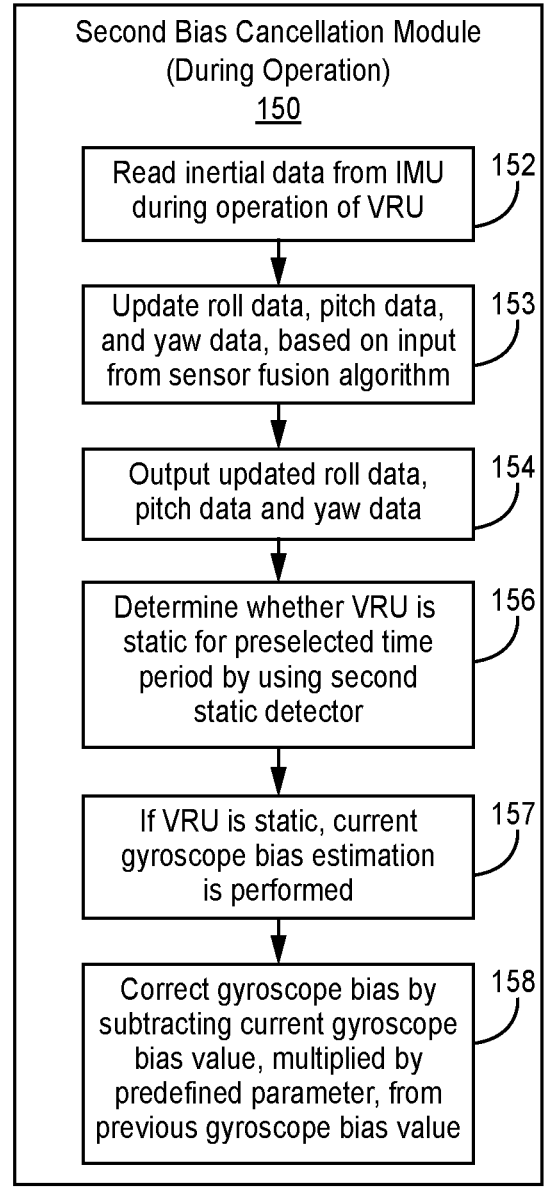
FIG. 1C is a flow diagram for a second bias cancelation module implemented by the system of FIG. 1A during in-run operation of the VRU.

As shown in FIG. 1C, second bias cancelation module 150 includes processor readable instructions to perform a method that reads the inertial data output from the IMU during operation of the VRU (block 152); updates the roll data, pitch data, and yaw data, based on input data from a sensor fusion algorithm (block 153); and outputs the updated roll data, pitch data, and yaw data (block 154). The method then determines whether the VRU is static for a preselected time period by using a second static detector (block 156). If the VRU is static for the preselected time period, a current gyroscope bias estimation is performed (block 157). The gyroscope bias is corrected by a process comprising subtracting a current gyroscope bias value, multiplied by a predefined parameter, from a previous gyroscope bias value (block 158).

In bias cancelation module 150, the second static detector (block 156) includes an average boundary parameter having a first threshold value, based on a predetermined static gyroscope data average during operation of the VRU; and a variance boundary parameter having a second threshold value, based on a predetermined standard deviation of static gyroscope data. If the current gyroscope data, or yaw rate data, have a mean and standard deviation that are less than the first and second thresholds for the preselected time period, then the VRU is determined to be static. During operation, the yaw rate data (yaw data change divided by time) are like the gyroscope data. Thus, the yaw rate data can also be used to determine whether the VRU is static by comparing the yaw rate data to the gyroscope based thresholds.

The present approach for reducing VRU unreferenced heading drift error is described in additional detail as follows.

VRU Unreferenced Heading Problem

For a VRU, various methods can be used to compute 3D orientation. The complimentary filter is one of the most common and simple methods. The IMU output data of tri-axis angular rate and tri-axis linear acceleration are used in the complimentary filter. The basic principal of the complimentary filter is listed in the equation below:

$$\text{Angle}=(a)*(\text{Previous Angle}+\text{Angular Rate}*dt)+(1-a)*(\text{Accelerometer Tilt Angle})$$

When the accelerometer is tilted, the gravity component on each orthogonal axis will change. By analyzing the accelerometer output, the accelerometer tilt angle can be computed. For the attitude (pitch and roll), the orientation data will be affected by both the angular rate integral, and the accelerometer tilt angle as reference attitude angles are drift free thanks to these references.

However, the heading (yaw) orientation is defined as the angle +x pointing in the plane perpendicular to the gravity orientation. The yaw orientation data will only be affected by the angular rate integral and cannot have gravity as a reference. For example, when the VRU rotates along the gravity orientation, while the heading angle keeps changing, the gravity component on each orthogonal axis will be the same. The heading orientation will be unreferenced unless other sensors like magnetometers get integrated into the system as a horizontal reference.

In traditional approaches, the yaw angle is computed using the angular rate integral only. An ideal IMU with gyroscope bias equal to zero (0) will have accurate and drift-free heading output just by using the angular rate integral. But for a MEMS grade IMU, the typical bias over temperature range is ±0.2°/s. This means the drift may reach 120° per 10 minutes maximum. That is unacceptable when it is desired to use the unreferenced yaw angle as a turn angle sensor. The present methods can reduce gyroscope bias more effectively as required in this instance.

Circulation Bias Cancelation (CBC) Algorithm

A simplified gyroscope model is listed below, $$\text{Gyro Output}=\text{Rotation Input}+\text{Gyro Bias}+\text{Noise}$$

When a VRU is in static condition, the angular movement caused by earth rotation is considered as the only rotation input (about 0.00417°/s) and may be smaller than the typical accuracy for MEMS gyroscopes. The noise has a similar character as white noise. Based on these two factors, it can be assumed that the gyroscope bias is equal to the output average when the VRU is placed in static condition.

With this assumption, the CBC algorithm updates the real-time gyroscope bias whenever the VRU is static. The real-time bias computed is generally more accurate than factory calibrated bias at that specific working condition. If the working condition does not change rapidly, the gyroscope bias will not change rapidly. The estimated real-time bias will be applicable for the dynamic scenario followed by the static period, and will result in less yaw drift.

For a MEMS gyroscope, most bias errors can be determined during the start-up process. Thereafter, the bias change is relatively small and continuous. To make the CBC algorithm more effective, it is divided into two bias cancelation process modules, with different thresholds used in the static detectors and bias correction processes.

Figure 2:
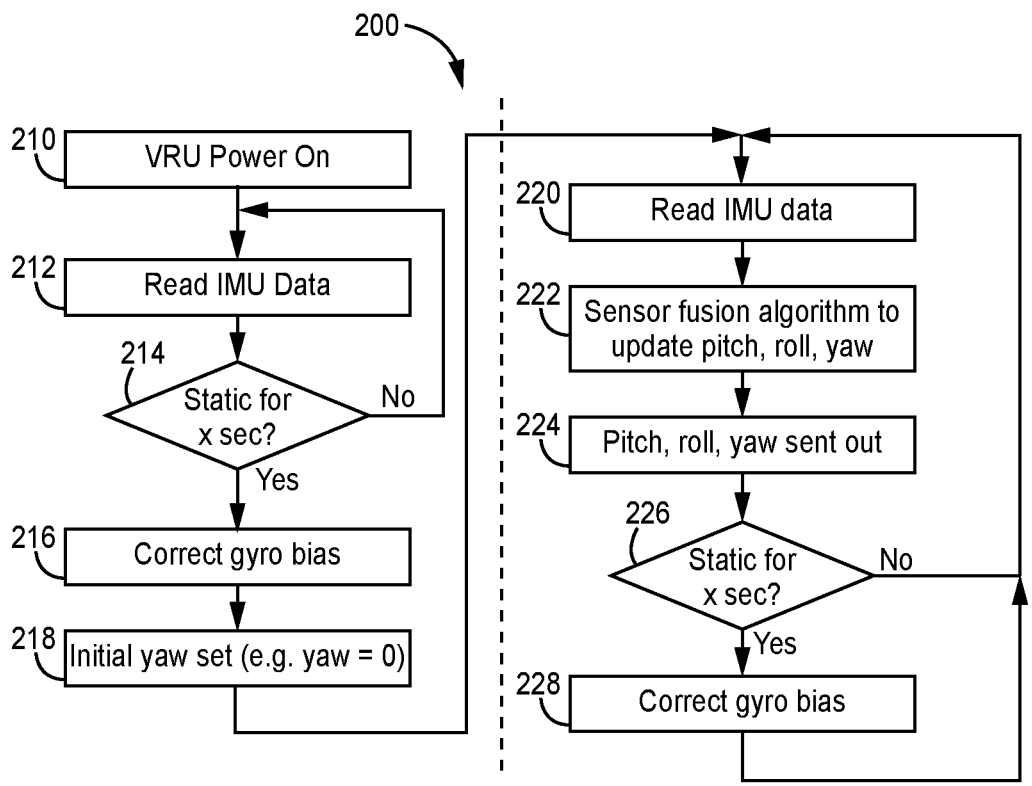
FIG. 2 is a flow diagram of a circulation bias cancelation (CBC) algorithm for a VRU, according to an exemplary implementation.

A workflow method 200 for the CBC algorithm is shown in FIG. 2. After the VRU is powered on during start-up (block 210), the IMU data is read at 212, and a determination is made whether the VRU is static for a preselected time period (x seconds), such as by using a first static detector (block 214). If the VRU is not static for the preselected time period, method 200 returns to block 210 and continues to read the IMU data. If the VRU is static for the preselected time period, method 200 corrects the gyroscope bias (block 216), such as by subtracting the initial bias value from a previous bias value. An initial yaw value is then set, e.g., yaw=0 (block 218).

Subsequently, method 200 reads the inertial data output from the IMU during operation of the VRU (block 220) and the initial yaw value (from block 218). A standard sensor fusion algorithm is used to update the pitch data, roll data, and yaw data (block 222), and the updated pitch, roll and yaw data is sent out (block 224). The method 200 then determines whether the VRU is static for a preselected time period (x seconds), such as by using a second static detector (block 226). If the VRU is not static for the preselected time period, method 200 returns to block 220 and repeats the above subsequent steps. If the VRU is static for the preselected time period, method 200 corrects the gyroscope bias value (block 228), such as by subtracting a current gyroscope bias value, multiplied by a predefined parameter, from a previous gyroscope bias value. The method 200 then returns to block 220 to read the IMU data and repeats the above subsequent steps.

Static Detector

The CBC algorithm will be engaged and update the bias when the VRU is in a static condition. The VRU needs to determine whether it is in static condition using the data from onboard sensors, including gyroscopes and accelerometers in the IMU.

As mentioned above, when the VRU is in static condition, the gyroscope output can be considered as bias plus a white noise. Statistically, the data average can be used to describe the bias, and the data standard deviation can be used to describe the noise level.

Gyroscope data average and standard deviation can be used to determine whether the VRU is static. In real-world applications, if the VRU is in movement, the gyroscope output will not be as stable as in the static condition, with the data average and standard deviation larger than its static values. For the accelerometer, the data standard deviation will also be larger than at its static value.

The static gyroscope data (average and standard deviation) and accelerometer data (standard deviation) may be affected by multiple aspects, such as the design of the MEMS chip; the configuration of the MEMS chip like range, sensitivity, etc.; calibration and compensation; onboard filters like lowpass filters, averaging decimating filters, etc.; and environment vibration like engine idle.

The static data is collected for the VRU in its desired working condition, and the static data average and standard deviation are computed. Then, a boundary parameter is selected for the static detector that is slightly larger than the VRU static value Each boundary parameter set may only be ideal for one or several defined working environments.

The CBC algorithm will result in a more accurate gyroscope bias estimation when the boundary parameter is set closer to the VRU static values. However, the smaller these parameters are, the stricter it will be for the algorithm to kick in when there is vibration.

In one example, gyroscope data can be used for static detection. The in-run average boundary is set as 0.5 deg/s and the variance boundary as 0.2 deg/s. When the gyroscope data is within this magnitude for 8 seconds, the VRU is considered to be in static condition. This boundary parameter set can successfully detect the static condition of a car idling at a stop sign, for example, but it will consider the VRU in movement when the car is moving. During VRU start-up, the gyroscope data average boundary can be assigned as 1.5 deg/s to cover the initial bias, which is relatively large. User configurable presets for the boundary parameters can be made available for different industries, such as for automobiles, automated guided vehicles (AGVs), and agriculture vehicles.

Bias Correction Approach

It has been found that subtracting the bias directly is not always the most effective way to correct for heading drift error. If the bias gets subtracted after the static condition is detected, the bias integral during the detection period before the cancelation is applied would also cause a yaw drift error.

Heading drift error caused by the bias integral in the start-up detection period is not a problem, as the yaw output will be reset. The bias update equation at start-up is listed below:

$$\text{Updated Bias} = \text{previous bias} - \text{initial bias computed.}$$

During in-run operation of the VRU, the following equation was developed for the bias adjustment. This bias update equation for in-run operation is listed below:

$$\text{Updated Bias} = \text{previous bias} - k * \text{current bias computed.}$$

Figure 3:
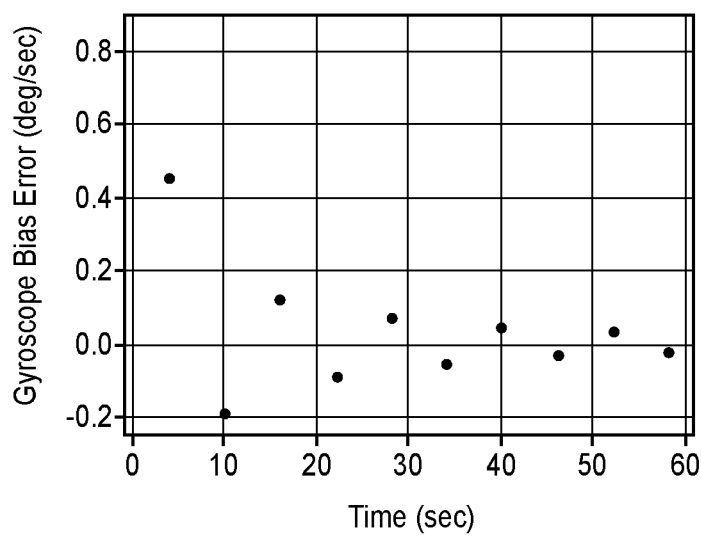
FIG. 3 is a graph showing the oscillatory convergence effect that is produced when a VRU is operating with the CBC algorithm enabled.

With this bias adjustment, the present approach creates an oscillatory convergence effect, which is illustrated in the graph of FIG. 3. As shown, the gyroscope bias error (bias integral) is reduced during the detection period, which will decrease the yaw drift in the long run.

Testing and Results

Two tests were designed and run to test the specific performance of the VRU yaw drift. Each test was applied to the same factory calibrated VRU (unit under test (UUT)) with the CBC algorithm turned on (enabled) or off (disabled). The testing procedures and results are described as follows.

Heading Static Drift Test

In a heading static drift test, the VRU was installed on a steady fixture and kept static during the whole test. The VRU was powered on and allowed to initialize per normal operating procedures. During this test, the heading output from the VRU was recorded for one hour. The heading deviation from the initial reading was considered as the heading static drift in the testing time because the VRU did not change its heading orientation.

Figure 4:
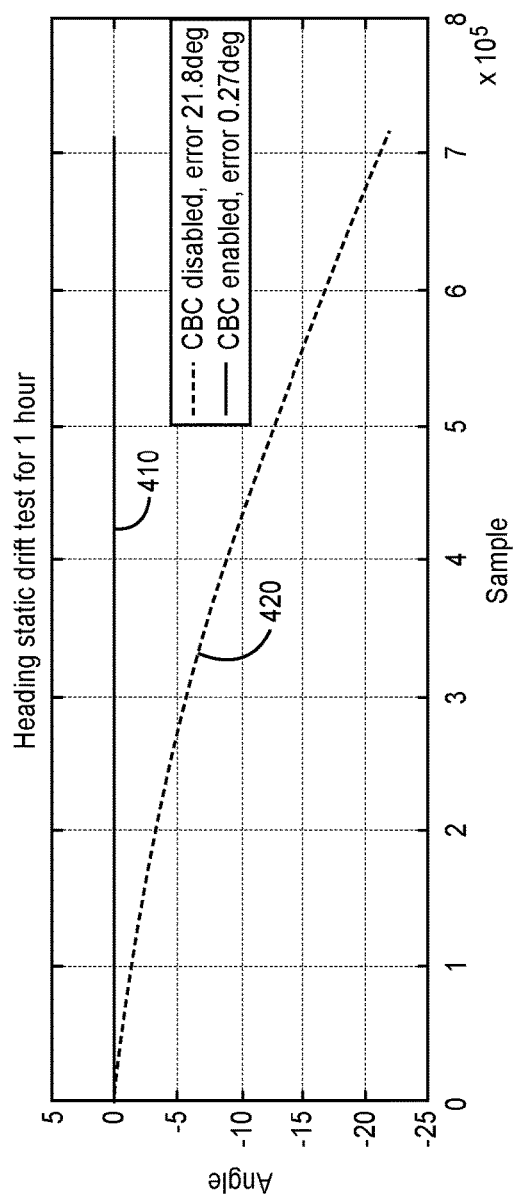
FIG. 4 is a graph showing the results of a heading static drift test for a VRU having the CBC algorithm enabled, and a VRU with the CBC algorithm disabled.

FIG. 4 is a graph of the results for the heading static drift test. As shown at plot 410, in the test with the CBC algorithm enabled, a much lower static yaw drift was detected (error of 0.27 degrees). As shown at plot 420, in the test with the CBC algorithm disabled, a much higher static yaw drift was detected (error of 21.8 degrees).

Heading Dynamic Drift Test

In a heading dynamic drift test, the VRU was installed on a leveled rate table. The VRU was powered on and allowed to initialize per normal operating procedures. An angular swing input was applied along the gravity axis at 180 degrees 0.2 Hz, for 10 minutes. After the swing, the rate table rotated to its starting position. The heading deviation from the initial reading was recorded as the dynamic drift error.

Figure 5:
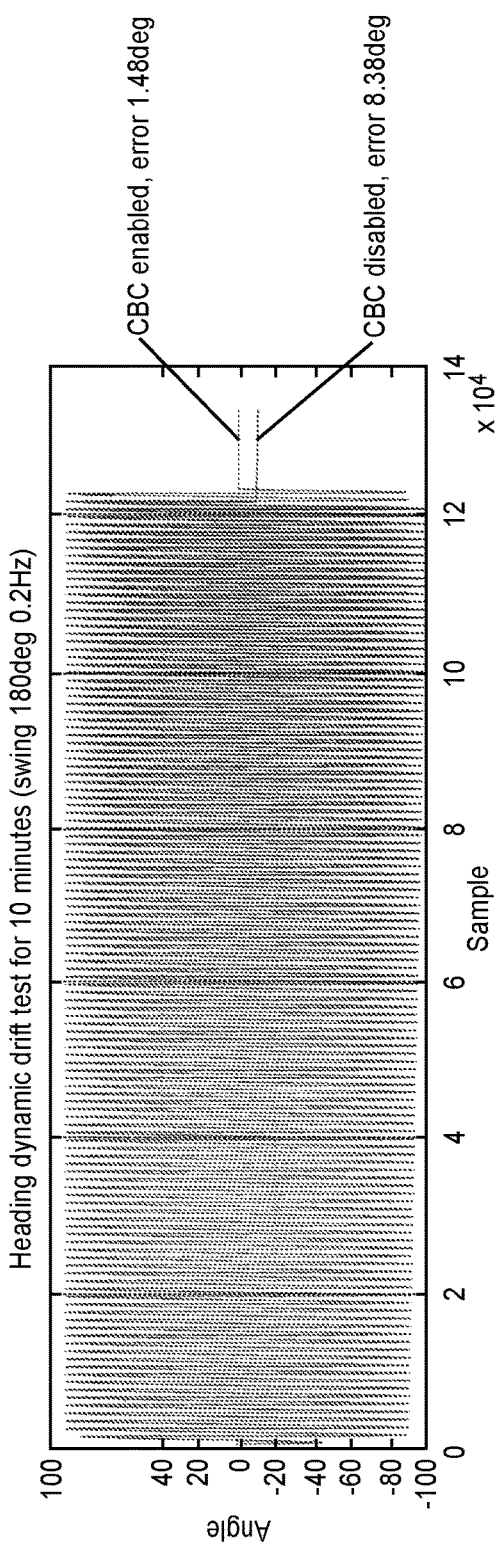
FIG. 5 is a graph showing the results of a heading dynamic drift test for a VRU having the CBC algorithm enabled, and a VRU with the CBC algorithm disabled.

FIG. 5 is a graph of the results of the heading dynamic drift test. The VRU with the CBC algorithm enabled performed better in dynamic operations (error of 1.48 degrees in 10 minutes) than the VRU with the CBC algorithm disabled (error of 8.38 degrees in 10 minutes).

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

A system comprising: a vertical reference unit (VRU) operative to output roll data, pitch data, and unreferenced yaw data for a vehicle, the VRU comprising: an inertial measurement unit (IMU) including at least one gyroscope and at least one accelerometer, the IMU operative to generate inertial data; and at least one processor operatively coupled to the IMU, wherein the at least one processor hosts a plurality of processing modules operative to reduce unreferenced heading drift error produced by the VRU; wherein the processing modules comprise: a first bias cancelation module including instructions to cause the at least one processor to: read the inertial data from the IMU when the VRU is powered on during start-up; determine whether the VRU is static for a preselected time period by using a first static detector; if the VRU is static for the preselected time period, correct gyroscope bias by subtracting an initial gyroscope bias value from a previous gyroscope bias value; and set a predefined initial yaw value; a second bias cancelation module including instructions to cause the at least one processor to: read the inertial data from the IMU during in-run operation of the VRU; update the roll data, pitch data, and yaw data, based on input data from a sensor fusion algorithm; output the updated roll data, pitch data, and yaw data; determine whether the VRU is static for a preselected time period by using a second static detector; and if the VRU is static for the preselected time period, correct the gyroscope bias by subtracting a current gyroscope bias value, multiplied by a predefined parameter, from a previous gyroscope bias value.

Example 2 includes the system of Example 1, wherein in the first bias cancelation module, the first static detector comprises: an average boundary parameter having a first threshold value, based on a predetermined static gyroscope data average during start-up of the VRU; and a variance boundary parameter having a second threshold value, based on a predetermined standard deviation of static gyroscope data; wherein if current gyroscope data, during start-up of the VRU, have a mean and standard deviation that are less than the first and second threshold values, for the preselected time period, then the VRU is determined to be static.

Example 3 includes the system of any of Examples 1-2, wherein in the second bias cancelation module, the second static detector comprises: an average boundary parameter having a first threshold value, based on a predetermined static gyroscope data average during in-run operation of the VRU; and a variance boundary parameter having a second threshold value, based on a predetermined standard deviation of static gyroscope data; wherein if current gyroscope data, or yaw rate data, have a mean and standard deviation that are less than the first and second threshold values, for the preselected time period, then the VRU is determined to be static.

Example 4 includes the system of any of Examples 1-3, wherein the second bias cancelation module creates an oscillatory convergence effect, such that a bias integral is reduced during a detection period, which decreases yaw drift.

Example 5 includes the system of any of Examples 1-4, wherein the IMU is a micro-electro-mechanical systems (MEMS) IMU.

Example 6 includes the system of any of Examples 1-5, wherein the IMU includes multiple gyroscopes and accelerometers.

Example 7 includes the system of any of Examples 1-6, wherein the at least one processor hosts an orientation processing module operative to compute a three-dimensional orientation of the vehicle, based on the inertial data from the IMU.

Example 8 includes the system of Example 7, wherein the orientation processing module is implemented with a complimentary filter.

Example 9 includes the system of any of Examples 1-8, wherein the vehicle is a land vehicle.

Example 10 includes the system of any of Examples 1-8, wherein the vehicle is a water vehicle.

Example 11 includes the system of any of Examples 1-8, wherein the vehicle is an air vehicle.

Example 12 includes a method comprising; providing a vertical reference unit (VRU) operative to output roll data, pitch data, and unreferenced yaw data for a vehicle, the VRU comprising: an inertial measurement unit (IMU) operative to generate inertial data, wherein the IMU includes one or more gyroscopes and accelerometers; and a processor operatively coupled to the IMU, wherein the processor hosts a plurality of processing modules operative to reduce unreferenced heading drift error produced by the VRU; wherein during start-up of the VRU, a first processing module performs a method comprising: reading the inertial data from the IMU; determining whether the VRU is static for a preselected time period using a first static detector; if the VRU is not static for the preselected time period, continue reading the inertial data from the IMU; if the VRU is static for the preselected time period, correcting gyroscope bias by subtracting an initial gyroscope bias value from a previous gyroscope bias value; and setting an initial yaw value; wherein during in-run operation of the VRU, a second processing module performs a method comprising: reading the inertial data from the IMU and the initial yaw value; updating the roll data, pitch data, and yaw data, based on input data from a sensor fusion algorithm; outputting the updated roll data, pitch data, and yaw data; determining whether the VRU is static for a preselected time period by using a second static detector; if the VRU is not static for the preselected time period, continue reading the inertial data from the IMU; and if the VRU is static for the preselected time period, correcting the gyroscope bias by subtracting a current gyroscope bias value, multiplied by a predefined parameter, from a previous gyroscope bias value.

Example 13 includes the method of Example 12, wherein the first static detector comprises: an average boundary parameter having a first threshold value, based on a predetermined static gyroscope data average during start-up of the VRU; and a variance boundary parameter having a second threshold value, based on a predetermined standard deviation of static gyroscope data; wherein if current gyroscope data, during start-up of the VRU, have a mean and standard deviation that are less than the first and second threshold values, for the preselected time period, then the VRU is determined to be static.

Example 14 includes the method of any of Examples 12-13, wherein the second static detector comprises: an average boundary parameter having a first threshold value, based on a predetermined static gyroscope data average during in-run operation of the VRU; and a variance boundary parameter having a second threshold value, based on a predetermined standard deviation of static gyroscope data; wherein if current gyroscope data, or yaw rate data, have a mean and standard deviation that are less than the first and second threshold values, for the preselected time period, then the VRU is determined to be static.

Example 15 includes the method of any of Examples 12-14, wherein the second processing module creates an oscillatory convergence effect, such that a bias integral is reduced during a detection period, which decreases yaw drift.

Example 16 includes the method of any of Examples 12-15, wherein the processor hosts an orientation processing module for computing a three-dimensional orientation of the vehicle, based on the inertial data from the IMU.

Example 17 includes the method of any of Examples 12-16, wherein the vehicle is a land vehicle.

Example 18 includes the method of any of Examples 12-16, wherein the vehicle is a water vehicle.

Example 19 includes the method of any of Examples 12-16, wherein the vehicle is an air vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system comprising:
   a vertical reference unit (VRU) operative to output roll data, pitch data, and unreferenced yaw data for a vehicle, the VRU comprising:
      an inertial measurement unit (IMU) including at least one gyroscope and at least one accelerometer, the IMU operative to generate inertial data; and
      at least one processor operatively coupled to the IMU, wherein the at least one processor hosts a plurality of processing modules operative to reduce unreferenced heading drift error produced by the VRU;
      wherein the processing modules comprise:
      a first bias cancelation module including instructions to cause the at least one processor to:
         read the inertial data from the IMU when the VRU is powered on during start-up;
         determine whether the VRU is static for a preselected time period by using a first static detector;
         if the VRU is static for the preselected time period, correct gyroscope bias by subtracting an initial gyroscope bias value from a previous gyroscope bias value; and
         set a predefined initial yaw value;
      a second bias cancelation module including instructions to cause the at least one processor to:
         read the inertial data from the IMU during in-run operation of the VRU;
         update the roll data, pitch data, and yaw data, based on input data from a sensor fusion algorithm;
         output the updated roll data, pitch data, and yaw data;
         determine whether the VRU is static for a preselected time period by using a second static detector; and
         if the VRU is static for the preselected time period, correct the gyroscope bias by subtracting a current gyroscope bias value, multiplied by a predefined parameter, from a previous gyroscope bias value.

2. The system of claim 1, wherein in the first bias cancelation module, the first static detector comprises:
an average boundary parameter having a first threshold value, based on a predetermined static gyroscope data average during start-up of the VRU; and
a variance boundary parameter having a second threshold value, based on a predetermined standard deviation of static gyroscope data;
wherein if current gyroscope data, during start-up of the VRU, have a mean and standard deviation that are less than the first and second threshold values, for the preselected time period, then the VRU is determined to be static.

3. The system of claim 1, wherein in the second bias cancelation module, the second static detector comprises:
an average boundary parameter having a first threshold value, based on a predetermined static gyroscope data average during in-run operation of the VRU; and
a variance boundary parameter having a second threshold value, based on a predetermined standard deviation of static gyroscope data;
wherein if current gyroscope data, or yaw rate data, have a mean and standard deviation that are less than the first and second threshold values, for the preselected time period, then the VRU is determined to be static.

4. The system of claim 1, wherein the second bias cancelation module creates an oscillatory convergence effect, such that a bias integral is reduced during a detection period, which decreases yaw drift.

5. The system of claim 1, wherein the IMU is a micro-electro-mechanical systems (MEMS) IMU.

6. The system of claim 1, wherein the IMU includes multiple gyroscopes and accelerometers.

7. The system of claim 1, wherein the at least one processor hosts an orientation processing module operative to compute a three-dimensional orientation of the vehicle, based on the inertial data from the IMU.

8. The system of claim 7, wherein the orientation processing module is implemented with a complimentary filter.

9. The system of claim 1, wherein the vehicle is a land vehicle.

10. The system of claim 1, wherein the vehicle is a water vehicle.

11. The system of claim 1, wherein the vehicle is an air vehicle.

12. A method comprising:
providing a vertical reference unit (VRU) operative to output roll data, pitch data, and unreferenced yaw data for a vehicle, the VRU comprising:
an inertial measurement unit (IMU) operative to generate inertial data, wherein the IMU includes one or more gyroscopes and accelerometers; and
a processor operatively coupled to the IMU, wherein the processor hosts a plurality of processing modules operative to reduce unreferenced heading drift error produced by the VRU;
wherein during start-up of the VRU, a first processing module performs a method comprising:
reading the inertial data from the IMU;
determining whether the VRU is static for a preselected time period using a first static detector;
if the VRU is not static for the preselected time period, continue reading the inertial data from the IMU;
if the VRU is static for the preselected time period, correcting gyroscope bias by subtracting an initial gyroscope bias value from a previous gyroscope bias value; and
setting an initial yaw value;
wherein during in-run operation of the VRU, a second processing module performs a method comprising:
reading the inertial data from the IMU and the initial yaw value;
updating the roll data, pitch data, and yaw data, based on input data from a sensor fusion algorithm;
outputting the updated roll data, pitch data, and yaw data;
determining whether the VRU is static for a preselected time period by using a second static detector;
if the VRU is not static for the preselected time period, continue reading the inertial data from the IMU; and
if the VRU is static for the preselected time period, correcting the gyroscope bias by subtracting a current gyroscope bias value, multiplied by a predefined parameter, from a previous gyroscope bias value.

13. The method of claim 12, wherein the first static detector comprises:
an average boundary parameter having a first threshold value, based on a predetermined static gyroscope data average during start-up of the VRU; and
a variance boundary parameter having a second threshold value, based on a predetermined standard deviation of static gyroscope data;
wherein if current gyroscope data, during start-up of the VRU, have a mean and standard deviation that are less than the first and second threshold values, for the preselected time period, then the VRU is determined to be static.

14. The method of claim 12, wherein the second static detector comprises:
an average boundary parameter having a first threshold value, based on a predetermined static gyroscope data average during in-run operation of the VRU; and
a variance boundary parameter having a second threshold value, based on a predetermined standard deviation of static gyroscope data;
wherein if current gyroscope data, or yaw rate data, have a mean and standard deviation that are less than the first and second threshold values, for the preselected time period, then the VRU is determined to be static.

15. The method of claim 12, wherein the second processing module creates an oscillatory convergence effect, such that a bias integral is reduced during a detection period, which decreases yaw drift.

16. The method of claim 12, wherein the processor hosts an orientation processing module for computing a three-dimensional orientation of the vehicle, based on the inertial data from the IMU.

17. The method of claim 12, wherein the vehicle is a land vehicle.

18. The method of claim 12, wherein the vehicle is a water vehicle.

19. The method of claim 12, wherein the vehicle is an air vehicle.

* * * * *